(12) United States Patent
Greco

(10) Patent No.: US 7,401,796 B1
(45) Date of Patent: Jul. 22, 2008

(54) COMPUTER RACK CART

(76) Inventor: David F. Greco, 68 Shingle Mill Rd., Harwington, CT (US) 06791

(*) Notice: Subject to any disclaimer, the term of this patent is extended or adjusted under 35 U.S.C. 154(b) by 277 days.

(21) Appl. No.: 11/152,233

(22) Filed: Jun. 15, 2005

Related U.S. Application Data

(60) Provisional application No. 60/580,247, filed on Jun. 16, 2004.

(51) Int. Cl.
- *B62B 3/00* (2006.01)
- *B62B 11/00* (2006.01)
- *A47B 81/00* (2006.01)
- *A47B 97/00* (2006.01)

(52) U.S. Cl. ............... 280/47.35; 280/47.34; 312/223.2; 312/223.3; 312/223.6

(58) Field of Classification Search .............. 280/47.34, 280/47.35; 312/223.3, 223.2, 223.6
See application file for complete search history.

(56) References Cited

U.S. PATENT DOCUMENTS

| | | | |
|---|---|---|---|
| 4,231,301 A * | 11/1980 | Barrineau, III | 108/146 |
| 4,681,378 A * | 7/1987 | Hellman, III | 312/223.2 |
| 4,720,048 A * | 1/1988 | Maroney et al. | 280/47.34 |
| 5,056,331 A * | 10/1991 | Lotz | 62/237 |
| 5,350,228 A * | 9/1994 | Remington | 312/223.1 |
| 6,293,507 B1 * | 9/2001 | Gorniak | 248/243 |
| 6,746,066 B2 * | 6/2004 | Reed | 296/26.08 |
| 6,769,568 B2 * | 8/2004 | Bonini et al. | 221/123 |
| 7,004,081 B2 * | 2/2006 | Chang | 108/50.01 |
| 7,055,833 B2 * | 6/2006 | Wixted et al. | 280/47.34 |
| 2002/0096845 A1 * | 7/2002 | Spann | 280/79.2 |
| 2002/0125798 A1 * | 9/2002 | Nielsen | 312/208.1 |
| 2003/0107195 A1 * | 6/2003 | Zambanini et al. | 280/47.34 |

* cited by examiner

*Primary Examiner*—Christopher Ellis
*Assistant Examiner*—John R Olszewski
(74) *Attorney, Agent, or Firm*—Sheldon H. Parker

(57) ABSTRACT

The present invention provides a mobile, electro-statically stable cart for storing and transporting computers, computer accessories, and sensitive computer equipment such as servers, Ethernet switches, and batteries. The body of the cart is configured to receive equipment in a portable rack mount fashion while providing protection against electro-static discharge events using anti-static wheels, either conductive or static dissipative, drag chains, grounding points, and static dissipative paint.

38 Claims, 4 Drawing Sheets

COMPUTER RACK CART

CROSS-REFERENCE TO RELATED APPLICATIONS

This application claims priority from U.S. Provisional Application No. 60/580,247, entitled "Computer Rack Cart" filed Jun. 16, 2004, the entire disclosure and contents of which are hereby incorporated by reference.

BACKGROUND

1. Field of the Invention

The present invention is directed generally to a computer cart and, more specifically, to an electrostatically stable, mobile computer rack cart for rack mountable servers.

2. Related Art

Computers and other computer equipment are not only commonly used in businesses today but are often a key component to businesses. One of the biggest problems with computers and computer equipment is that it is heavy, bulky, but delicate in that they are vulnerable to electrostatic discharge events. Therefore, computers and computer equipment cannot be safely transported in an easy manner. So while it would often be more convenient to mobilize a computer and/or computer equipment, doing so is very risky because the likelihood of damaging the equipment by an electrostatic discharge event is high.

SUMMARY

According to a first broad aspect of the present invention, there is provided a mobile, electro-statically stable cart for storing and transporting computers rack mountable servers, computer accessories, and other sensitive computer equipment such as servers, Ethernet switches, and batteries. The body of the cart is configured to receive equipment in a portable rack mount fashion while providing protection against electro-static discharge events using anti-static wheels, either conductive or static dissipative, drag chains, grounding points, and static dissipative paint.

BRIEF DESCRIPTION OF THE DRAWINGS

The invention will be described in conjunction with the accompanying drawings, in which.

DETAILED DESCRIPTION

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "rack mount" refers to a cabinet for housing computers and computer equipment, wherein the cabinet is standardized by the Electronic Industries Alliance.

For the purposes of the present invention, the term "electrostatic discharge" refers to a phenomenon that occurs when two materials come together and then separate. At the time of separation, electrons are transferred from one material to the other; the material losing electrons is positively charged, and the material gaining electrons is negatively charged.

For the purposes of the present invention, the term "electrostatically stable" refers to a situation or environment in which an electrostatic discharge event will not occur.

For the purposes of the present invention, the term "conductive" refers to a having a high mobility of charge so that the potential on the surface is retained for only a very short time.

For the purposes of the present invention, the term "static-dissipative" refers allowing a charge to migrate over a surface in a time that is short compared to the time scale of the actions creating the charge or the time within which this charge will be effective or will cause an electrostatic problem.

For the purposes of the present invention, the term "grounding" refers to having uniform electrical potential established in an area ensuring uniformity of electrical potential of all objects.

For the purposes of the present invention, the term "computer equipment" refers to any equipment of, relating to, compatible with, or accessory to computers including but not limited to computers, servers, Ethernet switches, and batteries.

For the purposes of the present invention, the term "computer accessories" refers to any suitable accessory to a computer including but not limited to keyboards, mice, and speakers.

DESCRIPTION

Figure 1:
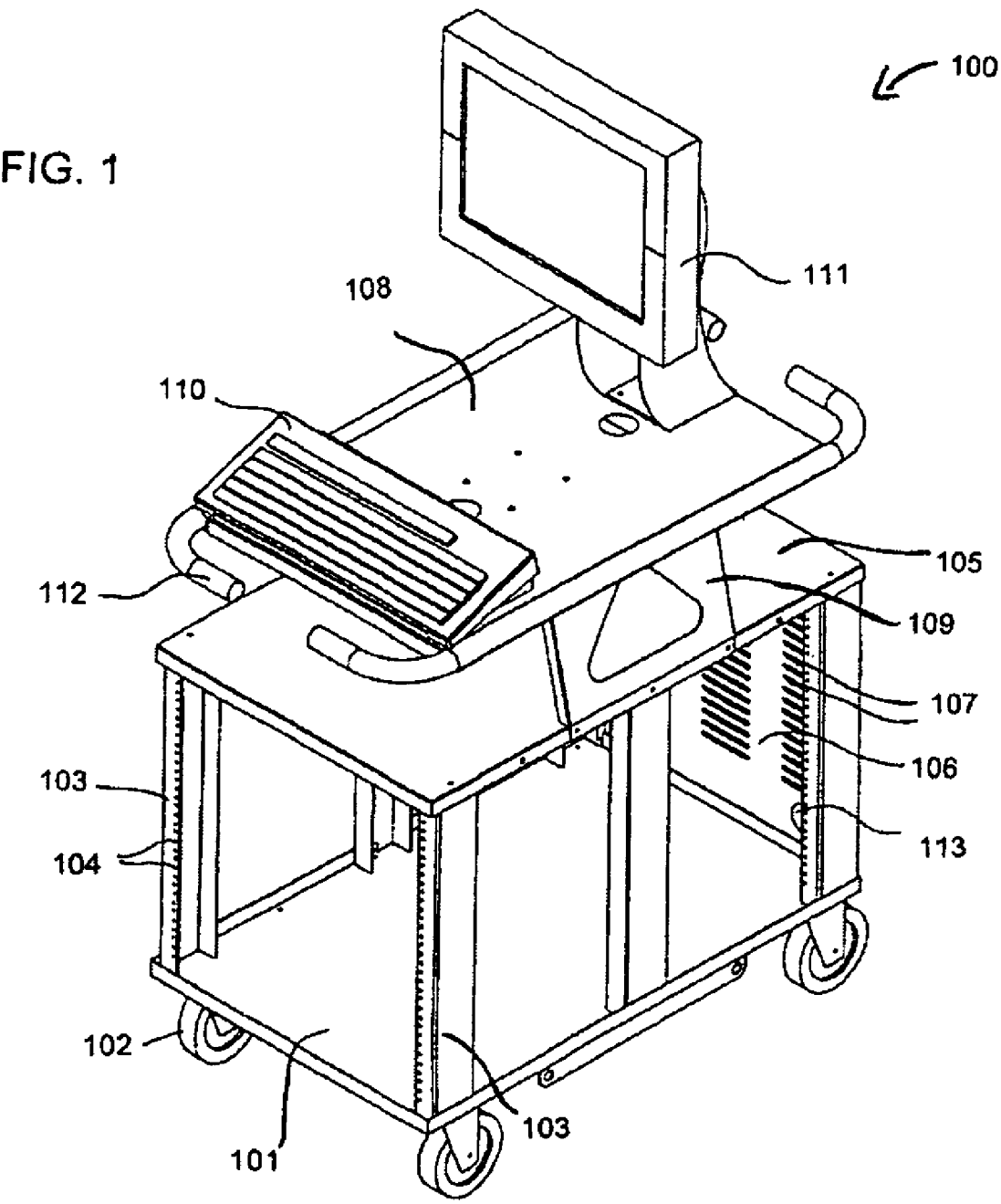
FIG. 1 is a schematic view of a cart embodiment showing interior details and having a suspending support platform.

The present invention is directed to a mobile, electro-statically stable cart for storing and transporting computer equipment in a rack mount configuration. The cart of the present invention allows computer equipment such as servers that are typically rack mounted in a stationary position to be safely mounted in a mobile configuration. One embodiment of the cart is shown in FIG. 1. As shown in FIG. 1, cart 100 includes a base 101 having an upper surface and a lower surface and a front side and back side. Wheels 102 are attached to the lower surface of base 101. Base 101 preferably has four corners and a wheel 102 attached proximal to each of said corners; however, base 101 could be any desired and functionally feasible shape and any desired number of wheels could be attached to the base.

Wheels 102 are anti-static, being either conductive or static dissipative so as to promote grounding. The wheels can be conductive as for example, model 5MC Metro Conductive Stem Casters sold by InterMetro Industries Corporation, North Washington Street, Wilkes-Barrie, Pa. 18705. The casters conform to Federal Specification FF-C-88 C.

Figure 2:
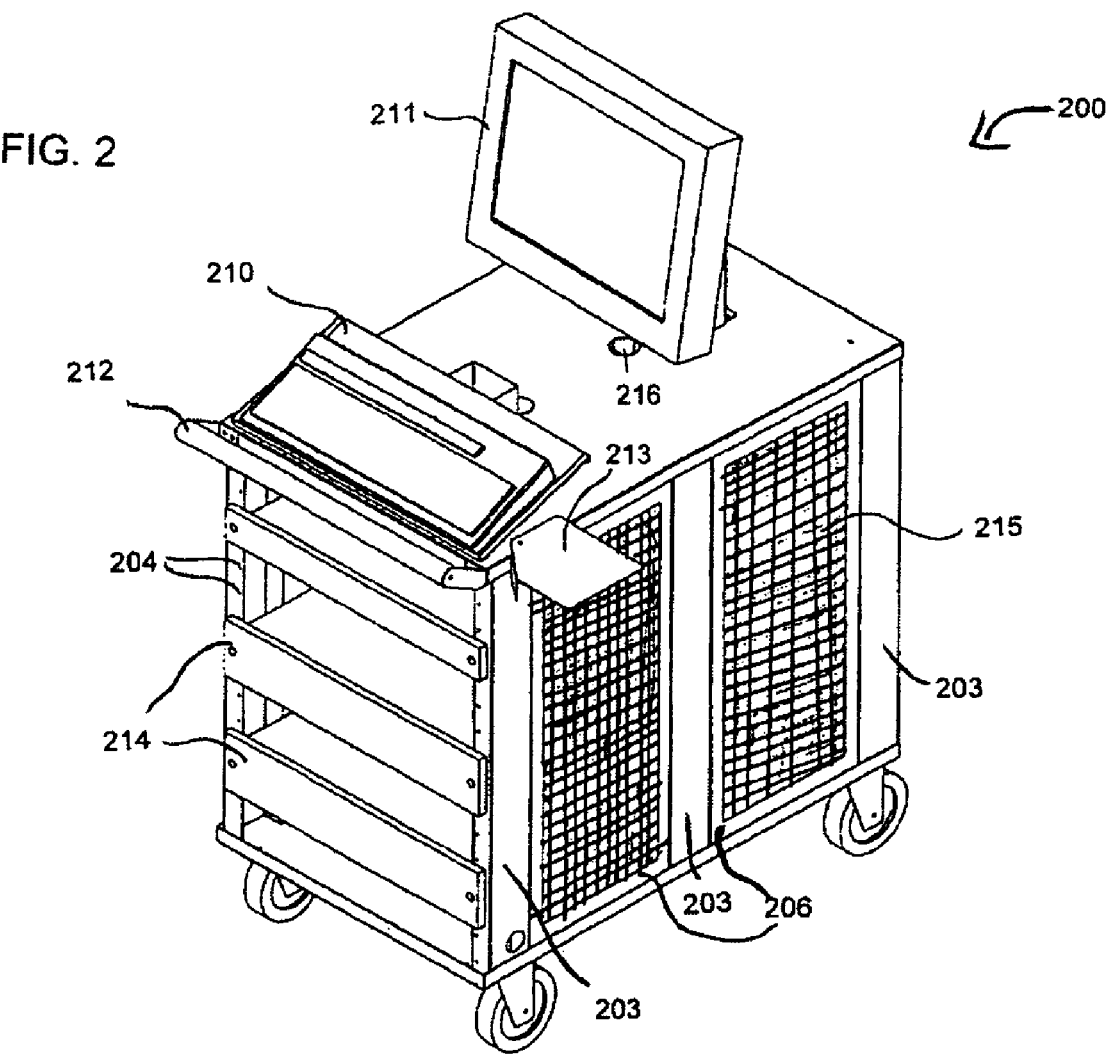
FIG. 2 is a schematic view of a cart embodiment showing exterior details and having a top panel support.

Support rails 103 are attached to the upper surface of base 101 and extend vertically to top panel 105. There are at least four and preferably six support rails attached to base 101 including two front rails, two middle rails, and two rear rails. Each rail includes as series of holes 104 which serve as an attachment mechanism for computer equipment including but not limited to servers, batteries, and Ethernet switches, that can be attached directly to the support rails 103. FIG. 2 illustrates a cart 200 wherein computer equipment 214 is directly attached to cart 200 at holes 204 within rails 203. In order to provide proper support of the equipment, it is critical that the rails 203 and the holes 204 within are aligned with one another. The computer equipment 214 is attached at the two front rails and extends back toward the middle and back rails, which provide support as needed. Further equipment can be attached to the middle and back rails.

Rear panel 106 extends from the base 101 to the top panel 105 to enclose the backside of the cart 100. Rear panel 106 preferably includes vents 107 to allow for ventilation of the stored equipment and at least one access hole 113 to allow passage of equipment cords and data links and/or provide immediate access to equipment located in the back of the cart. Further rear panel 106 is removable to provide further access to equipment and wires in the rear of the cart 100. As shown in FIG. 2, cart 200 further comprises side panels 206 to enclose the space between support rails 203. Side panels 206 are preferably vented so as to allow for ventilation of stored equipment. This is preferably accomplished through the use of mesh 215 in the side panels 206, but can also be accomplished by incorporating vents into side panels 206 such as vents 107 shown in rear panel 106. Mesh 215 provides maximum ventilation while still providing some protection to the equipment 214 stored within the cart.

A top panel 105, parallel to the base 101, sits atop and is attached to the support rails 103. Top panel 105 indirectly supports computer accessories such as a keyboard 110 or monitor 111 as shown in FIG. 1, or, alternately, top panel 205 directly supports computer accessories such as keyboard 210 and monitor 211 as shown in FIG. 2. For indirect support as in FIG. 1, an equipment platform 108 directly supports the keyboard 110 and monitor 111 while be suspended above and attached to top panel 105 by platform support 109. Equipment platform 108 preferably includes handles 112 extending from both the front and rear of the platform. Having equipment platform 108 suspended above top panel 105 provides for additional space to transport further equipment, documents, etc. For direct support as in FIG. 2, the computer accessories rest directly on the top panel 205 while a handle 212 protrudes directly from the top panel 205. As shown in FIG. 2, other computer accessories such as a mouse support 213 can be included on the top of the cart. Top panel 105 or 205 can also include at least one hole 216 for passage of cords, cables, etc.

Figure 3:
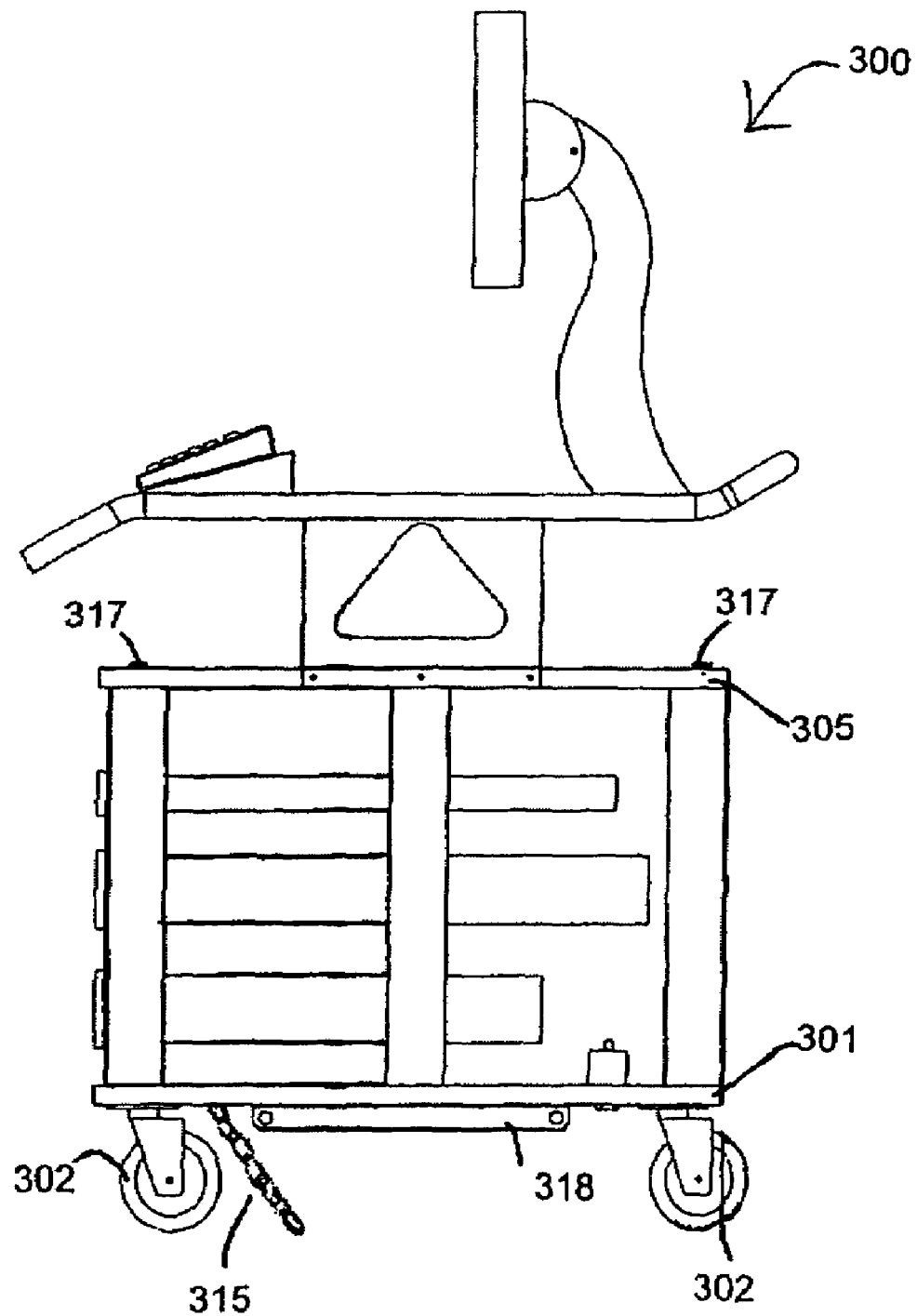
FIG. 3 is a side view of a cart with side panels removed showing interior equipment mounted details and electrostatic stability features.
Figure 4:
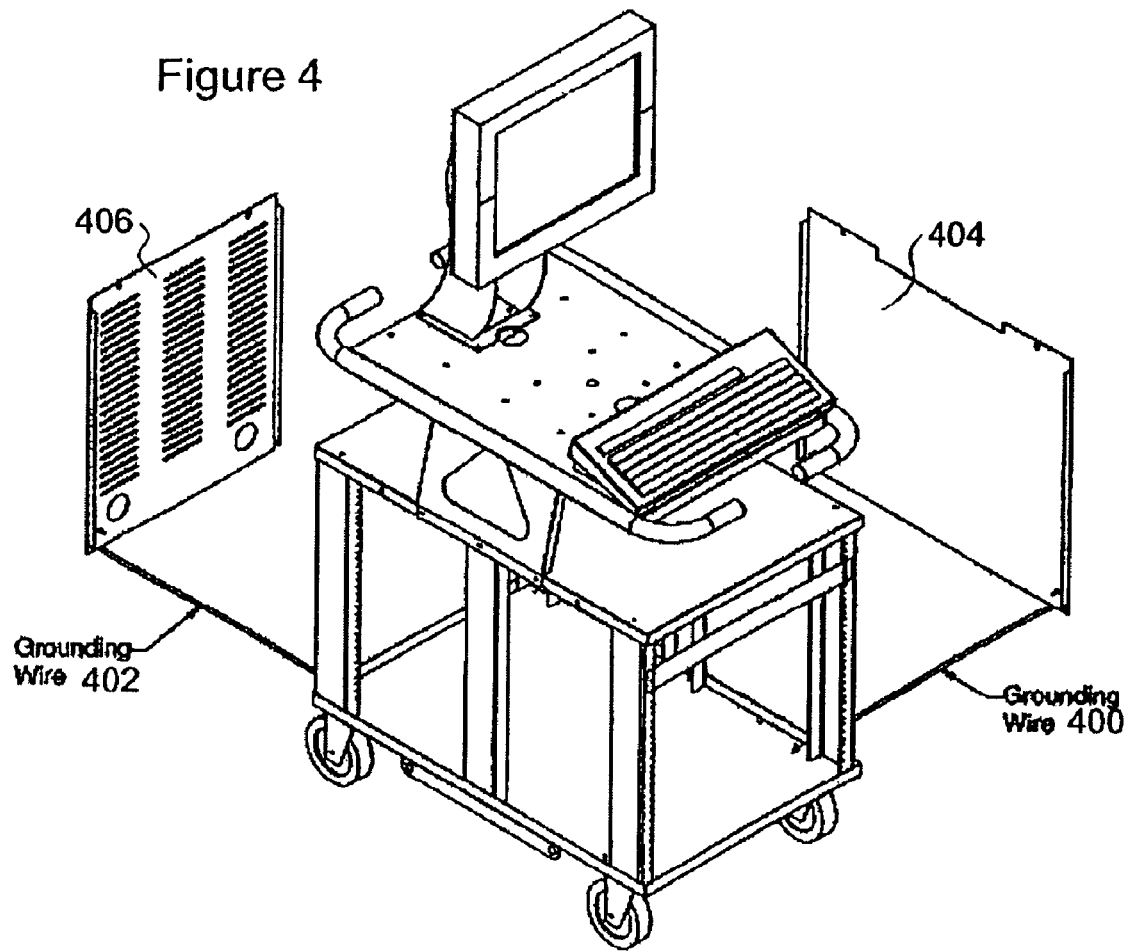
FIG. 4 is a perspective view showing side panels separated from the cart, but connected by grounding wires.

In order to ensure electrical stability of the cart and thereby prevent electro-static discharge (ESD) events, the cart includes several anti-static measures as shown in FIG. 3. As discussed above, wheels 302 are anti-static, either conductive or static dissipative, to promote grounding of the cart. To further promote grounding, a drag chain 315 is suspended from cart 300 to contact the floor. Drag chain 315 is preferably made of brass and is suspended from base 301. Cart 300 is also equipped with at least one, and preferably four, wrist strap grounding points 317 preferably located at top panel 305. Wrist straps connected to the wrist strap grounding points 317 attach to the user(s) of the cart thereby keeping the user(s) at the same electrical potential as the cart to avoid and ESD event. Further, all side and rear cart access panels have ground points which are connected to the cart 300 at all times. Even when the panels are removed from the cart, they are connected by a wire to the cart as shown in FIG. 4. The wire 400 and 402 provide a grounded connection between the cart and the panels. Finally, the cart is preferably painted with static dissipative paint. Further safety features can be added to the cart such as a seismic tie down point 318 attached to base 301 or a static dissipative mat placed under the cart or on a portion of the cart such as the base or the top panel. Static dissipative mats are preferably made of either rubber or vinyl and have characteristics similar to static dissipative paint by controlling the rate of electrical discharge. When a mat is used under the cart, the mat is connected to a ground point through the use of a ground lead kit.

The cart of the present invention preferably has about the same width dimensions as an industry standard 19-inch computer rack mount. Therefore, computer servers and other equipment for which the industry standard racks are designed can fit within the cart, thereby making them mobile. Specifically, the width of the cart from the inside edge of one front, middle, or rear support rail to the inside edge of the adjacent front, middle, or rear support rail is at least about 17 inches, preferably about 17¾ inches; the width of the cart from the holes on one front, middle, or rear support rail to the holes on the adjacent front, middle, or rear support rail is at least about 18 inches, preferably about 18 5/16 inches; and the width of the cart from the outside edge of one front, middle, or rear support rail to the outside edge of the adjacent front, middle, or rear support rail is at least about 20 inches, preferably about 20 7/16 inches.

While the 19 inch rack dimensions are preferred, the cart could also have other width dimensions as desired such as the width dimensions of an industry standard 23 inch rack, i.e. the width of the cart from the inside edge of one front, middle, or rear support rail to the inside edge of the adjacent front, middle, or rear support rail is at least about 21 inches, preferably about 21¾ inches; the width of the cart from the holes on one front, middle, or rear support rail to the holes on the adjacent front, middle, or rear support rail is at least about 22 inches, preferably about 22 5/16 inches; and the width of the cart from the outside edge of one front, middle, or rear support rail to the outside edge of the adjacent front, middle, or rear support rail is at least about 24 inches, preferably about 24 7/16 inches.

Regardless of the width of cart, the depth of the cart from the front of the base to the rear of the base is at least about 30 inches, and preferably about 32 inches. While the height of the cart can vary, the preferred heights are 10 U or 14 U. 1 U equal about 1.75 inches; therefore, the 10 U cart yields about 17.5 inches in usable rack height from base to top panel while the 14 U cart yields about 24.5 inches in usable rack height from base to top panel.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A mobile, electrostatically stable rack mountable server cart comprising:
   a base having an upper surface, a lower surface, a front side, and a back side;
   a plurality of wheels attached to said lower surface of said base;
   a top panel positioned substantially parallel to said base;
   a plurality of support rails having a length, an inner edge, and an outer edge, said support rails extending vertically from said upper surface of said base and connecting said base with said top panel;
   multiple attachment mechanisms within each of said support rails, each of said multiple attachment mechanisms being spaced from adjacent attachment mechanisms to directly secure said at least one rack mountable server;

at least one battery, said at least one battery being interconnected with at least one server to power said at least one server;

a rear panel extending from said base to said top panel between support rails;

a plurality of side panels extending from said base to said top panel between support rails at least one of said plurality of side panels being a removable side panel;

an open front region dimensioned to receive said at least one rack mountable server; and a plurality of anti-static mechanisms, at least one of said plurality of anti-static mechanisms being attached to said removable side panel.

2. The cart of claim 1 wherein one of said anti-static mechanisms is said plurality of wheels, said wheels being conductive or static-dissipative.

3. The cart of claim 1 wherein one of said anti-static mechanisms is a drag chain suspended from said base.

4. The cart of claim 1 wherein one of said anti-static mechanisms is at least one grounding point.

5. The cart of claim 4 wherein said grounding point is attachable to a user of said cart.

6. The cart of claim 4 wherein said grounding point is connected to said panels.

7. The cart of claim 1 wherein one of said anti-static mechanisms is static-dissipative paint coating at least said panels and rails of said cart.

8. The cart of claim 1 wherein said plurality of support rails is at least four support rails, said support rails being positioned along sides and back of said cart.

9. The cart of claim 8 wherein said at least four support rails comprise six support rails including two front rails, two middle rails, and two rear rails, said support rails being positioned along sides and back of said cart.

10. The cart of claim 1 wherein said multiple attachment is mechanisms are a plurality of holes spanning the length of each of said plurality of rails, each of said holes aligned with corresponding holes of said each of said plurality of rails.

11. The cart of claim 1 wherein said base has four corners with one of said plurality of wheels positioned proximal to each of said four corners.

12. The cart of claim 9 wherein at least one piece of computer equipment is supported by at least said front rails.

13. The cart of claim 9 wherein at least one piece of computer equipment is supported by at least said middle rails.

14. The cart of claim 9 wherein at least one piece of computer equipment is supported by at least said rear rails.

15. The cart of claim 1 further comprising a plurality of vents within said rear panel.

16. The cart of claim 1 further comprising at least one access hole in said rear panel.

17. The cart of claim 1 wherein said rear panel is removable.

18. The cart of claim 1 further comprising a plurality of vents within said side panels.

19. The cart of claim 1 wherein said side panels are comprised of a mesh material.

20. The cart of claim 1 wherein said top panel supports computer accessories.

21. The cart of claim 20 further comprising an equipment platform attached to said top panel, said equipment platform supporting said computer accessories.

22. The cart of claim 1 further comprising a seismic tie down point.

23. The cart of claim 1 further comprising a static dissipative mat.

24. The cart of claim 1 wherein said plurality of support rails comprises at least a first pair and second pair of support rails.

25. The cart of claim 24 wherein a width measured between said inner edge of said at least first pair of support rails and said inner edge of said at least second pair of support rails is in the range of about 17 inches to about 21 inches.

26. The cart of claim 25 wherein the distance between adjacent edges of adjacent support rails is about 17¾ inches to meet industry standards for rack mountable servers.

27. The cart of claim 25 wherein the distance between adjacent edges of adjacent support rails is about 21¾ inches to meet industry standards for rack mountable servers.

28. The cart of claim 24 wherein a width measured between said attachment mechanisms of said at least first pair of support rails and said attachment mechanisms of said at least second pair of support rails is in the range of about 18 inches to about 22 inches.

29. The cart of claim 28 wherein the distance between said attachment mechanisms said width is about 18⁵⁄₁₆ inches to meet industry standards for rack mountable servers.

30. The cart of claim 28 wherein the distance between said attachment mechanisms is about 22⁵⁄₁₆ inches to meet industry standards for rack mountable servers.

31. The cart of claim 24 wherein a width measured between said outer edge of said at least first pair of support rails and said outer edge of said at least second pair of support rails is in the range of about 20 inches to about 24 inches.

32. The cart of claim 31 wherein said width is about 20⁷⁄₁₆ inches.

33. The cart of claim 31 wherein said width is about 24⁷⁄₁₆ inches.

34. The cart of claim 1 wherein a depth measured from said front side of said base to said back side of said base is at least about 30 inches.

35. The cart of claim 34 wherein said depth is 32 inches.

36. The cart of claim 1 wherein a height measured from said base to said top panel is about 10 U to meet industry standards for rack mountable servers.

37. The cart of claim 1 wherein the height measured from said base to said top panel is about 14 U to meet industry standards for rack mountable servers.

38. A mobile, electrostatically stable rack mountable server comprising:

a base having an upper surface, a lower surface, a front side, and a back side;

a plurality of anti-static wheels attached to said lower surface of said base, said wheels being either conductive or static-dissipative;

a top panel positioned substantially parallel to said base;

at least four support rails having a length, an inner edge, and an outer edge, said support rails extending vertically from said upper surface of said base and connecting said base with said top panel, said support rails supporting at least one rack mountable server;

a plurality of holes spanning the length of each of said support rails, each of said holes aligned with a corresponding hole in each of said support rails, said holes receiving said at least one rack mountable server;

at least one battery said at least one battery to power said at least one server;

a removable, vented rear panel extending from said base to said top panel between support rails;

a plurality of vented side panels extending from said base to said top panel between support rails;

at least one drag chain suspended from said base;

at least one grounding point attachable to a user of said cart;

at least one grounding point connected to said panels;

static-dissipative paint coating at least said panels and said rails.

* * * * *